(12) United States Patent
Higaki

(10) Patent No.: US 9,599,382 B2
(45) Date of Patent: Mar. 21, 2017

(54) AIR-CONDITIONING REMOTE CONTROLLER AND AIR-CONDITIONING SYSTEM

(75) Inventor: Yoshihiko Higaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 810 days.

(21) Appl. No.: 13/569,367

(22) Filed: Aug. 8, 2012

(65) Prior Publication Data

US 2013/0219935 A1 Aug. 29, 2013

(30) Foreign Application Priority Data

Feb. 28, 2012 (JP) .................................. 2012-41143

(51) Int. Cl.
*F25B 49/00* (2006.01)
*G05D 23/19* (2006.01)
(Continued)

(52) U.S. Cl.
CPC ......... *F25B 49/00* (2013.01); *G05D 23/1905* (2013.01); *F24F 11/0086* (2013.01); *F24F 2011/0091* (2013.01); *F25B 49/02* (2013.01)

(58) Field of Classification Search
CPC ........... F24F 11/0086; F24F 2011/0091; F24F 2221/32; F25B 49/00; G05D 23/19;
(Continued)

(56) References Cited

U.S. PATENT DOCUMENTS 4,819,714 A * 4/1989 Otsuka ............... G05D 23/1904
165/217
4,997,029 A * 3/1991 Otsuka .................... F24F 3/044
165/11.1
(Continued)

FOREIGN PATENT DOCUMENTS

JP 6-11167 A 1/1994
JP 2000-238522 A 9/2000
(Continued)

OTHER PUBLICATIONS

Office Action (Notice of Reasons for Refusal) issued on May 7, 2015, by the Japanese Patent Office in corresponding Japanese Patent Application No. 2012-041143, and an English Translation of the Office Action. (6 pages).

*Primary Examiner* — Etsub Berhanu
*Assistant Examiner* — Amanda P Setiawan
(74) *Attorney, Agent, or Firm* — Buchanan Ingersoll & Rooney PC

(57) ABSTRACT

An air-conditioning remote controller includes a display section, an operable section, a memory, a transmitter unit, and a processor. The operable section includes a set-temperature increase button and a set-temperature decrease button. In the memory, information designating an upper limit, a lower limit, or both the upper limit and the lower limit as a setting target in setback control is set. The processor makes the display section display a set temperature or temperatures designated by the setting target set in the memory, changes the set temperature or temperatures designated by the setting target on the basis of an operation result of one of or both of the set-temperature increase button and the set-temperature decrease button, and transmits the changed result to the transmitter unit.

4 Claims, 5 Drawing Sheets

(51) Int. Cl.
*F24F 11/00* (2006.01)
*F25B 49/02* (2006.01)

(58) Field of Classification Search
CPC ........... G05D 23/1902; G05D 23/1917; G05D 23/1905; G06F 3/04847
USPC .... 62/126, 127, 231; 236/1 B, 1 C; 700/276, 700/278
See application file for complete search history.

(56) References Cited

U.S. PATENT DOCUMENTS

| | | | | |
|---|---|---|---|---|
| 6,116,512 | A * | 9/2000 | Dushane | F24D 19/10 165/238 |
| 8,090,477 | B1 * | 1/2012 | Steinberg | 700/278 |
| 8,167,216 | B2 * | 5/2012 | Schultz | F24F 11/006 236/1 B |
| 2006/0102732 | A1 * | 5/2006 | Garrett | G05D 23/1905 236/94 |
| 2007/0012052 | A1 * | 1/2007 | Butler et al. | 62/181 |
| 2007/0043478 | A1 * | 2/2007 | Ehlers | F24F 11/0012 700/276 |
| 2007/0137225 | A1 | 6/2007 | Shindo et al. | |
| 2007/0278320 | A1 * | 12/2007 | Lunacek et al. | 236/94 |
| 2008/0048046 | A1 * | 2/2008 | Wagner et al. | 236/91 R |
| 2008/0277487 | A1 * | 11/2008 | Mueller et al. | 236/46 A |
| 2009/0001180 | A1 * | 1/2009 | Siddaramanna et al. | 236/46 R |
| 2009/0140056 | A1 * | 6/2009 | Leen | 236/49.3 |
| 2009/0140057 | A1 * | 6/2009 | Leen | 236/49.3 |
| 2011/0132990 | A1 * | 6/2011 | Lin et al. | 236/46 R |
| 2011/0132991 | A1 * | 6/2011 | Moody et al. | 236/46 R |
| 2012/0067561 | A1 * | 3/2012 | Bergman | B60H 1/00657 165/257 |

FOREIGN PATENT DOCUMENTS

| | | |
|---|---|---|
| JP | 2007-170686 A | 7/2007 |
| JP | 2009-229009 A | 10/2009 |
| WO | WO 2011/101892 A1 | 8/2011 |

* cited by examiner

F I G. 3
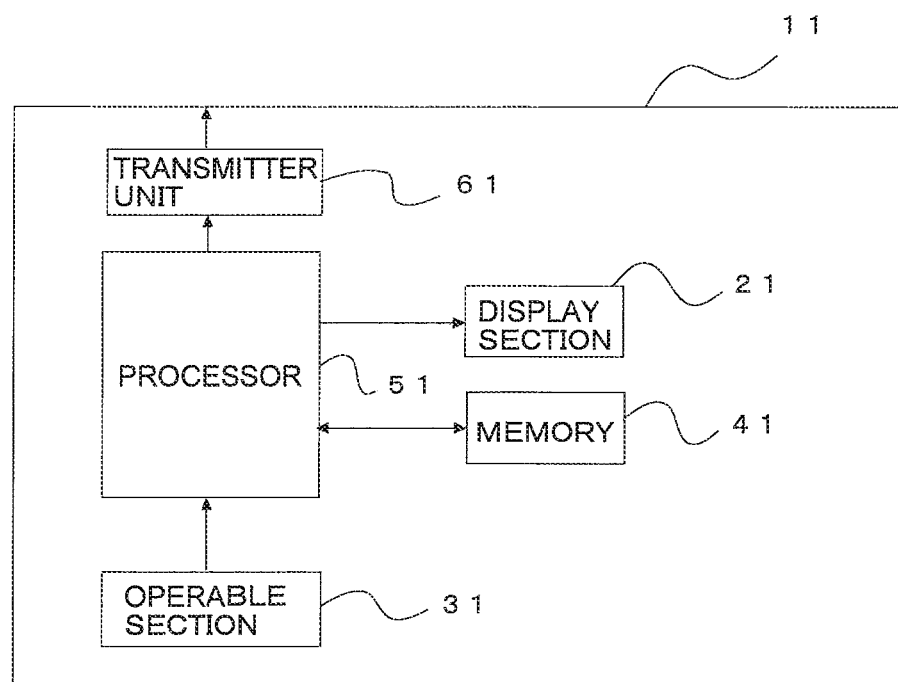

F I G. 4

| CURRENT OPERATION MODE | | SET TEMPERATURE | | SETTING TARGET | |
|---|---|---|---|---|---|
| AUTO | | 19 | | — | |
| COOL | | 18 | | — | |
| HEAT | | 28 | | — | |
| SETBACK | 1 | UPPER LIMIT | 25 | TWO-LIMIT | 1 |
| | | LOWER LIMIT | 20 | UPPER LIMIT | |
| | | | | LOWER LIMIT | |

AIR-CONDITIONING REMOTE CONTROLLER AND AIR-CONDITIONING SYSTEM

BACKGROUND OF THE INVENTION

Field of the Invention

The present invention relates to air-conditioning remote controllers and air-conditioning systems.

Description of the Related Art

An air-conditioning remote controller in the related art includes various kinds of buttons, such as an on/off button, an operation mode button, a set-temperature increase button, a set-temperature decrease button, and a wind-speed button, and also includes a display section that shows the operational status, such as the operation mode, the set temperature, and the wind speed, of an air-conditioning apparatus.

The operational status of the air-conditioning apparatus can be changed by pressing such various buttons. For example, when the air-conditioning apparatus is in operation, the display section displays the current set temperature. In this case, every time the set-temperature increase button is pressed once, the set temperature is increased by 1° C., whereas every time the set-temperature decrease button is pressed once, the set temperature is decreased by 1° C. The various buttons are assigned in this manner in accordance with the contents displayed in the display section (for example, see Japanese Unexamined Patent Application Publication No. 2009-229009 (paragraphs [0019] to [0023], FIG. 1)).

Another known type of an air-conditioning apparatus is configured to perform setback control that requires two values, i.e., an upper limit and a lower limit, as set temperatures. In such an air-conditioning apparatus, the two set temperatures can be set by using an integrated controller provided with an input device, such as an air-conditioning remote controller (for example, see WO 2011/101892 (paragraphs [0021] to [0023])).

CITATION LIST

Patent Literature

[Patent Literature 1] JP2009-229009A (Paragraphs 0019-0023, and FIG. 1)

[Patent Literature 2] WO2011/101892 (Paragraphs 0021-0023)

SUMMARY OF THE INVENTION

In a case where the two set temperatures for setback control are to be set, an air-conditioning remote controller equipped with a high-function user interface is required. One example is a high-function air-conditioning remote controller equipped with a graphical user interface (GUI) that allows for a soft button operation via a touch-screen. Another example is a high-function air-conditioning remote controller equipped with, for example, multiple operable buttons as a high-function user interface. In this case, for example, the operable buttons include buttons corresponding to the two set temperatures, such as an upper-limit set-temperature increase button, an upper-limit set-temperature decrease button, a lower-limit set-temperature increase button, and a lower-limit set-temperature decrease button. In this case, since the operable buttons and the displayed contents correspond to each other, the user can readily determine which one of the set temperatures is settable by operating the corresponding operable button. Therefore, an air-conditioning remote controller equipped with a high-function user interface, such as a graphical user interface or multiple operable buttons, can provide an interface that is intuitively comprehensible by the user.

However, a remote controller equipped with a high-function user interface is expensive and tends to be large in product size. Therefore, there is a low-cost, low-function remote controller from which some functions have been removed. There is also a remote controller with a smaller display section or a reduced number of operable buttons for achieving a smaller product size. In this case, because it is difficult to provide the operable buttons corresponding to the two set temperatures for setback control, the interface needs to be provided by the limited operable buttons and the limited display section. Therefore, in the low-cost remote controller with the reduced product size, there is a problem in that an interface that is intuitively comprehensible by the user cannot be provided.

The present invention has been made to solve the aforementioned problem, and an object thereof is to provide an air-conditioning remote controller that provides an interface that is intuitively comprehensible by a user even if the cost and the product size are reduced, and an air-conditioning apparatus.

An air-conditioning remote controller according to the present invention includes a display section that displays information related to an operational status of an air-conditioning apparatus; an operable section for controlling the operational status of the air-conditioning apparatus; a storage unit that stores information related to set temperatures according to operation modes of the air-conditioning apparatus; a transmitter unit that transmits a command related to the operational status of the air-conditioning apparatus to the air-conditioning apparatus; and a control unit that changes the information related to the set temperatures and controls the display section and the transmitter unit on the basis of an operation performed on the operable section. The operable section includes a set-temperature increase button that generates an operation signal for increasing each set temperature, and a set-temperature decrease button that generates an operation signal for decreasing each set temperature. In the storage unit, information designating an upper limit, a lower limit, or both the upper limit and the lower limit as a setting target in setback control, which is one of the operation modes, in which air-conditioning is performed within two set temperatures, which are the upper limit and the lower limit, is set. The control unit makes the display section display the set temperature or temperatures designated by the setting target set in the storage unit, changes the set temperature or temperatures designated by the setting target on the basis of an operation result of one of or both of the set-temperature increase button and the set-temperature decrease button, and transmits a changed result to the transmitter unit.

The present invention is advantageous in that, even if the cost and the product size are reduced, an interface that is intuitively comprehensible by a user can be provided by setting a plurality of set temperatures based on a predetermined setting target.

BRIEF DESCRIPTION OF THE DRAWINGS

FIG. 3 is a block diagram illustrating an internal configuration example of the remote controller according to Embodiment 1 of the present invention;

FIG. 4 illustrates an example of information stored in a memory according to Embodiment 1 of the present invention.

DESCRIPTION OF THE PREFERRED EMBODIMENT

Embodiment 1 of the present invention will be described below with reference to the drawings.

Embodiment 1

Figure 1:
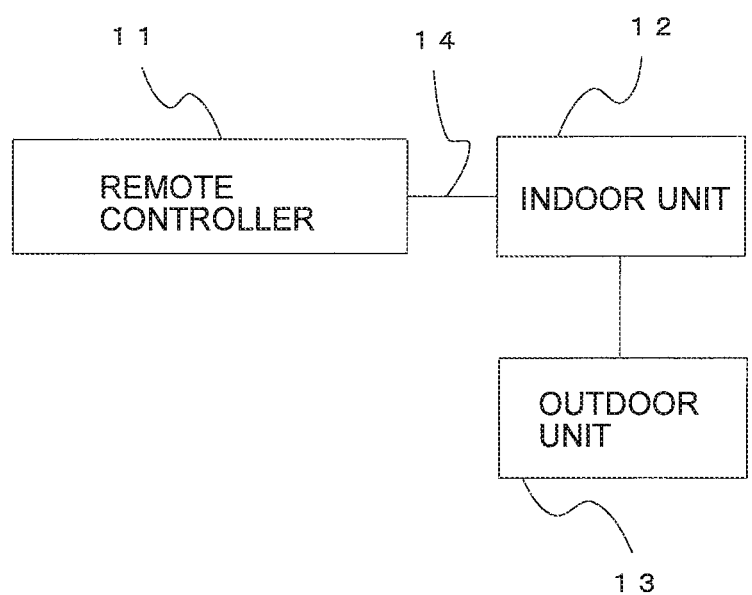
FIG. 1 illustrates a system configuration that uses a remote controller according to Embodiment 1 of the present invention.

FIG. 1 illustrates a system configuration that uses a remote controller 11 according to Embodiment 1 of the present invention. As shown in FIG. 1, the remote controller 11 is connected to an indoor unit 12 via a transmission line 14 and performs communication with the indoor unit 12. The indoor unit 12 and an outdoor unit 13 are connected to each other via a refrigerant pipe and a signal line (not shown). Based on a control command from the remote controller 11, the indoor unit 12 and the outdoor unit 13 change the pressure of a refrigerant flowing through the refrigerant pipe so that heat is rejected from or received by the refrigerant, whereby air-conditioning is performed.

An external configuration example of the remote controller 11, an internal configuration example thereof, and details of processing performed therein will be described later.

The indoor unit 12 and the outdoor unit 13 will collectively be referred to as an air-conditioning apparatus.

The indoor unit 12 includes an indoor-unit-side heat exchanger, an indoor-unit-side fan, an indoor-unit-side expansion valve, and an indoor temperature sensor (not shown).

Based on a signal from the remote controller 11, the indoor unit 12 controls the operation of the various types of means constituting the indoor unit 12.

The indoor-unit-side heat exchanger performs heat exchange between air and the refrigerant passing through the heat exchanger.

The indoor-unit-side fan sends air to the heat exchanger where the air exchanges heat with the refrigerant, and also sends the air having undergone the heat exchange into a room.

The indoor-unit-side expansion valve controls the flow rate of the refrigerant by adjusting the opening degree of the valve. Thus, the amount of refrigerant passing through the indoor-unit-side heat exchanger is controlled so that evaporation or the like of the refrigerant in the indoor-unit-side heat exchanger is controlled.

The indoor temperature sensor detects the indoor temperature in the room where the indoor unit 12 is installed.

The outdoor unit 13 includes a compressor, an outdoor-unit-side heat exchanger, an outdoor-unit-side fan, an outdoor-unit-side expansion valve, and a four-way valve (not shown).

Based on a signal from the remote controller 11, the outdoor unit 13 controls the operation of the various types of means constituting the outdoor unit 13.

The compressor takes in the refrigerant, compresses the refrigerant, and applies an arbitrary pressure thereto before discharging the refrigerant.

The outdoor-unit-side heat exchanger performs heat exchange between air and the refrigerant passing through the heat exchanger.

The outdoor-unit-side fan sends air to the heat exchanger for the heat exchange.

The outdoor-unit-side expansion valve controls the flow rate of the refrigerant by adjusting the opening degree of the valve.

The four-way valve switches pipe routes in accordance with, for example, a cooling mode and a heating mode.

Figure 2:
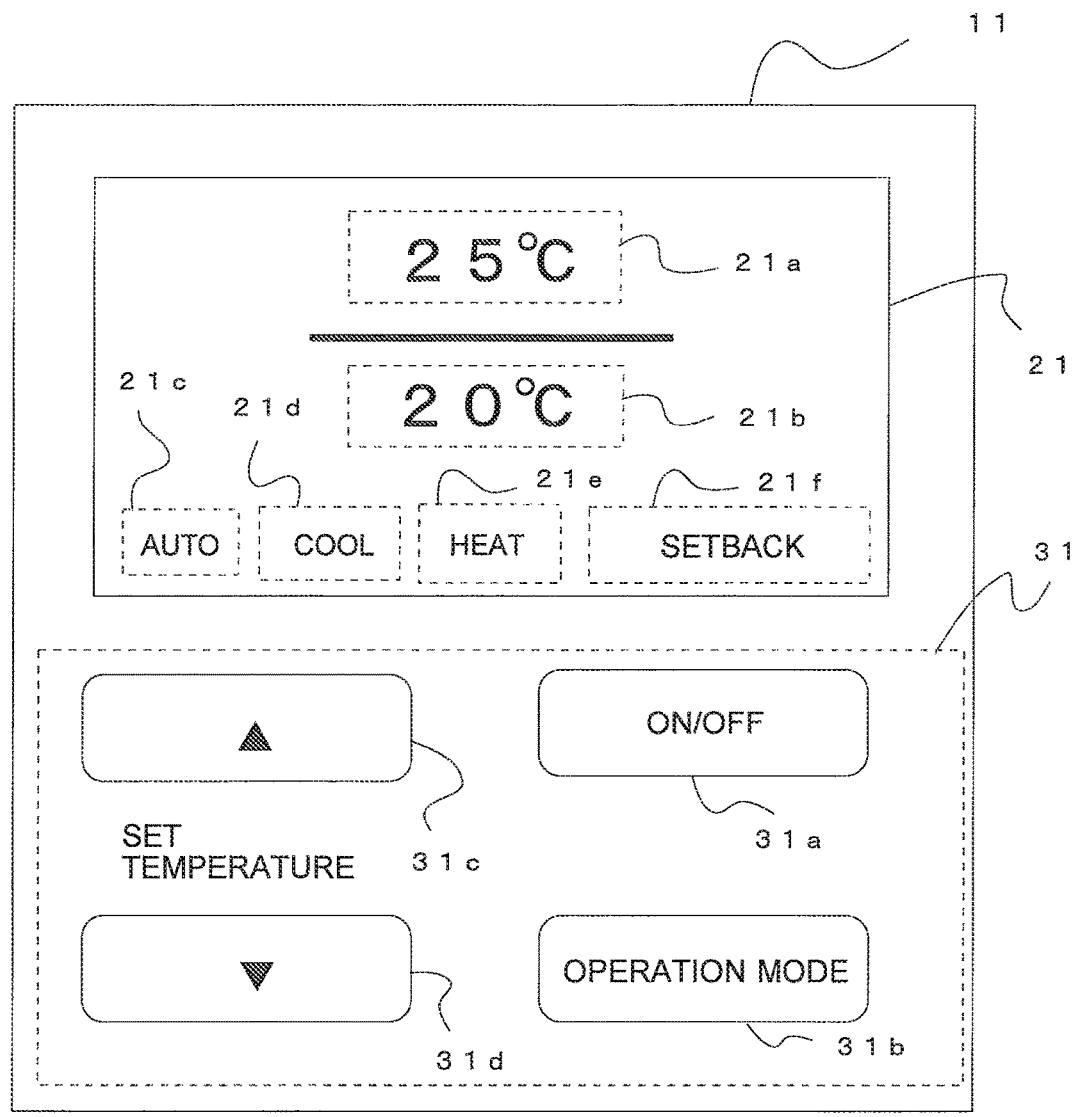
FIG. 2 illustrates an external configuration example of the remote controller according to Embodiment 1 of the present invention.

FIG. 2 illustrates an external configuration example of the remote controller 11 according to Embodiment 1 of the present invention. As shown in FIG. 2, the remote controller 11 is formed into a substantially rectangular-shaped housing by using synthetic resin or the like, and includes a display section 21 and an operable section 31.

The depth dimension of the remote controller 11 is not shown in the drawing.

The display section 21 is formed of, for example, a liquid-crystal display device and displays an operation mode and set temperatures expressing the status and set contents of the air-conditioning apparatus.

Specifically, the display section 21 includes areas 21a to 21f. The area 21a displays an upper-limit set temperature. The area 21b displays a lower-limit set temperature. The area 21c displays, for example, the characters "AUTO" indicating that the apparatus is operating in an automatic mode. The area 21d displays, for example, the characters "COOL" indicating that the apparatus is operating in a cooling mode. The area 21e displays, for example, the characters "HEAT" indicating that the apparatus is operating in a heating mode. The area 21f displays, for example, the characters "SETBACK" indicating that the apparatus is performing setback control.

Although display contents are displayed in all of the areas 21a to 21f in FIG. 2, some of the contents, for example, the upper-limit set temperature, the lower-limit set temperature, and "SETBACK", are displayed in actuality. Furthermore, the contents displayed in the areas 21a to 21f are appropriately displayed in a blinking manner in accordance with conditions, to be described later.

Moreover, the sizes of the characters and the fonts displayed in the areas 21a to 21f are examples, and are not limited thereto.

Furthermore, the positions of the areas 21a to 21f in the display section 21 are examples, and are not limited thereto.

Moreover, the display section 21 may be formed of another type of a display device instead of a liquid-crystal display device.

The operable section 31 is constituted of, for example, various kinds of operable buttons, and is an interface that receives commands for starting or stopping the operation of the air-conditioning apparatus, changing the operation mode of the air-conditioning apparatus, and changing the set temperatures.

Specifically, the operable section 31 includes an on/off button 31a, an operation mode button 31b, a set-temperature increase button 31c, and a set-temperature decrease button 31d.

The on/off button 31a is an interface that receives an operation start command and an operation stop command for the air-conditioning apparatus. When the on/off button 31a is pressed while the air-conditioning apparatus is stopped, the air-conditioning apparatus starts operating, and the current operation mode and the current set temperatures are displayed in the display section 21. When the on/off button 31*a* is pressed while the air-conditioning apparatus is in operation, the air-conditioning apparatus stops operating.

The operation mode button 31*b* is an interface that receives a command for changing the operation mode of the air-conditioning apparatus. Every time the operation mode button 31*b* is pressed once, the apparatus is set to a different operation mode. For example, if the setting is changeable in the following order: automatic mode, cooling mode, heating mode, and setback control, when the operation mode button 31*b* is pressed once while the apparatus is currently operating in the cooling mode, the operation mode is set to the heating mode.

When the operation mode is set to the automatic mode by pressing the operation mode button 31*b*, the characters "AUTO" are displayed in the area 21*c* of the display section 21 in a continuously-lit manner, and one set temperature is displayed in the area 21*b*, so that when the air-conditioning apparatus is in operation, the automatic mode is performed.

When the operation mode is set to the cooling mode by pressing the operation mode button 31*b*, the characters "COOL" are displayed in the area 21*d* of the display section 21 in a continuously-lit manner, and one set temperature is displayed in the area 21*b*, so that when the air-conditioning apparatus is in operation, the cooling mode is performed.

The displayed contents described above may alternatively be displayed in the area 21*a*.

When the operation mode is set to the heating mode by pressing the operation mode button 31*b*, the characters "HEAT" are displayed in the area 21*e* of the display section 21 in a continuously-lit manner, and one set temperature is displayed in the area 21*b*, so that when the air-conditioning apparatus is in operation, the heating mode is performed.

When the operation mode is set to the setback control by pressing the operation mode button 31*b*, the characters "SETBACK" are displayed in the area 21*f* of the display section 21 in a continuously-lit manner, and the upper-limit set temperature and the lower-limit set temperature are respectively displayed in the area 21*a* and the area 21*b*, so that when the air-conditioning apparatus is in operation, the setback control is performed.

In the setback control, the air-conditioning apparatus operates within the range between the upper-limit set temperature and the lower-limit set temperature.

As will be described later, the operation mode button 31*b* also receives a command for changing other control contents (i.e., a setting target changing process to be described later).

The set-temperature increase button 31*c* is an interface that receives a command for increasing the set temperature displayed in the display section 21. Every time the set-temperature increase button 31*c* is pressed once, the set temperature is increased by a predetermined range, for example, +1° C., while the air-conditioning apparatus is in operation.

The set-temperature decrease button 31*d* is an interface that receives a command for decreasing the set temperature displayed in the display section 21. Every time the set-temperature decrease button 31*d* is pressed once, the set temperature is decreased by a predetermined range, for example, −1° C., while the air-conditioning apparatus is in operation.

Processing to be performed when the set-temperature increase button 31*c* and the set-temperature decrease button 31*d* are pressed will be described in detail later. Although the various operable buttons in FIG. 2 are substantially rectangular-shaped, the shapes thereof are not limited thereto.

FIG. 3 is a block diagram illustrating an internal configuration example of the remote controller 11 according to Embodiment 1 of the present invention. As shown in FIG. 3, the remote controller 11 includes the display section 21, the operable section 31, a memory 41, a processor 51, and a transmitter unit 61.

The display section 21 displays data stored in the memory 41, to be described below, and also displays a processing result obtained by the processor 51, to be described below.

When each kind of operable button in the operable section 31 is pressed, a code corresponding to that operable button is generated, and the generated code is input to the processor 51 that performs internal control of the remote controller 11.

The memory 41 temporarily stores data by using, for example, a rewritable random access memory (RAM). Furthermore, the memory 41 uses, for example, a read-only memory (ROM) to store the codes corresponding to the various operable buttons, a processing program, and parameters. In other words, the memory 41 is constituted of the RAM and the ROM.

The processor 51 reads the processing program from the memory 41 and executes the processing program on the basis of the frequency of a transmitter (not shown) that supplies a constant clock signal. Furthermore, when the operable section 31 is operated by a user, the processor 51 supplies a code for controlling the air-conditioning apparatus to the transmitter unit 61 and the operation result of the operable section 31 to the display section 21, in correspondence with the user operation.

The transmitter unit 61 modulates the supplied code for transmission, and then transmits the modulated transmission signal to the indoor unit 12.

The memory 41 corresponds to a storage unit according to the present invention.

The processor 51 corresponds to a control unit according to the present invention.

Although the above description relates to an example of a wired connection type in which the remote controller 11 and the indoor unit 12 are connected to each other via the transmission line 14, as shown in FIG. 1, the present invention is not limited to this configuration. For example, a wireless remote controller for wirelessly controlling the air-conditioning apparatus is also permissible. Moreover, a wireless remote controller for controlling the air-conditioning apparatus by using an infrared signal is also permissible. In this case, a signal from the transmitter unit 61 is supplied to a light-emitting diode (LED) within a light-emitting unit (not shown), and a predetermined signal may be transmitted from the LED to the indoor unit 12.

Furthermore, the processing in the remote controller 11 may be performed by an application installed in a computer (not shown). In this case, the computer and the indoor unit 12 are connected to each other via a communication medium so that the computer and the indoor unit 12 are communicable with each other.

FIG. 4 illustrates an example of information stored in the memory 41 according to Embodiment 1 of the present invention. Referring to FIG. 4, as the current operation mode, a total of four kinds of operation modes are defined, i.e., "AUTO" denoting the automatic mode, "COOL" denoting the cooling mode, "HEAT" denoting the heating mode, and "SETBACK" denoting the setback control. In accordance with the pressing of the operation mode button 31*b*, the remote controller 11 differentiates the current operation mode from among the four kinds of operation modes by, for example, adding a flag 1 to an item corresponding to the current operation mode.

Because "AUTO", "COOL", and "HEAT" items each have one set temperature, one set-temperature value corresponding thereto is set in association therewith.

Because a "SETBACK" item has two set temperatures, temperature values corresponding to the upper limit and the lower limit are set in association therewith.

Furthermore, since the "SETBACK" item has two set temperatures, there are multiple setting targets. In this case, the remote controller 11 differentiates whether the setting target has two limits, which simultaneously denote designation of both the upper limit and the lower limit, or whether the setting target is only the upper limit or the lower limit by, for example, adding the flag 1.

Such information is stored in the RAM of the memory 41 as data.

FIG. 4 shows an example in which the current operation mode is the setback control mode, the set temperature is 19° C. for "AUTO" mode, the set temperature is 18° C. for "COOL" mode, the set temperature is 28° C. for "HEAT" mode, and the upper limit and the lower limit are 25° C. and 20° C., respectively, and the target setting is two-limit for "SETBACK" mode.

Figure 5:
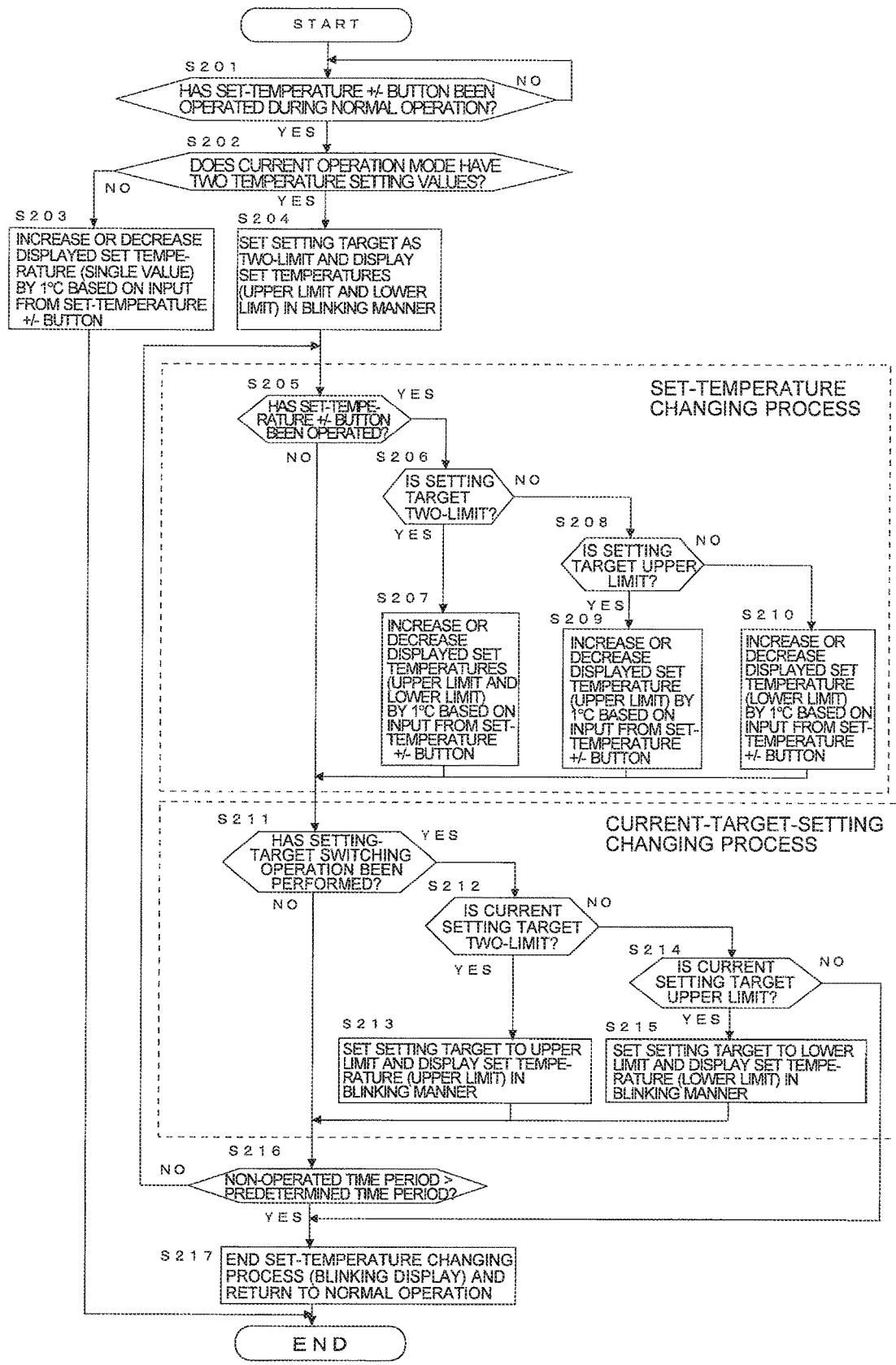
FIG. 5 is a flowchart for explaining an example of control performed by a processor according to Embodiment 1 of the present invention.

FIG. 5 is a flowchart for explaining an example of control performed by the processor 51 according to Embodiment 1 of the present invention.

In step S201, the processor 51 determines whether or not the set-temperature increase button 31c or the set-temperature decrease button 31d (the set-temperature increase button 31c or the set-temperature decrease button 31d will be referred to as "set-temperature +/− button" hereinafter) is operated during normal operation. Specifically, if the set-temperature +/− button is operated during normal operation, the processor 51 proceeds to step S202. On the other hand, if the set-temperature +/− button is not operated during normal operation, the processor 51 returns to step S201.

In step S202, the processor 51 determines whether or not the current operation mode is a mode having two set-temperature values. Specifically, if a determination flag for the current operation mode shown in FIG. 4 is given to the "SETBACK" item, the processor 51 determines that the current operation mode is a mode having two set-temperature values and proceeds to step S204. On the other hand, if the determination flag for the current operation mode shown in FIG. 4 is given to the "AUTO", "COOL", or "HEAT" item, the processor 51 determines that the current operation mode is not a mode having two set-temperature values and proceeds to step S203.

In step S203, the processor 51 increases or decreases the displayed set temperature (single value) by 1° C. on the basis of an input from the set-temperature +/− button, and ends the process.

Step S203 is performed during the automatic mode, the cooling mode, or the heating mode, whereas steps S204 to S217 to be described below are performed during the setback control.

In step S204, the processor 51 sets the setting target to the two-limit, makes the display section 21 display the set temperatures (i.e., the upper limit and the lower limit) in a blinking manner, and proceeds to step S205. In this case, the flag 1 is set in the "TWO-LIMIT" item under the setting target shown in FIG. 4, the upper-limit and lower-limit set-temperature values shown in FIG. 4 are read from the memory 41, and the two read values are respectively displayed in a blinking manner in the area 21a and the area 21b of the display section 21.

Steps S205 to S210 to be described below correspond to a set-temperature changing process.

In step S205, the processor 51 determines whether or not the set-temperature +/− button is operated. Specifically, if the set-temperature +/− button is operated, the processor 51 proceeds to step S206. On the other hand, if the set-temperature +/− button is not operated, the processor 51 proceeds to step S211.

In step S206, the processor 51 determines whether or not the setting target is the two-limit. Specifically, if the target-setting flag shown in FIG. 4 is given to the "TWO-LIMIT" item, the processor 51 proceeds to step S207. On the other hand, if the target-setting flag shown in FIG. 4 is not given to the "TWO-LIMIT" item, the processor 51 proceeds to step S208.

In step S207, the processor 51 increases or decreases both of the displayed set temperatures (upper limit and lower limit) by 1° C. on the basis of an input from the set-temperature +/− button, and then proceeds to step S211. For example, if the set-temperature increase button 31c is pressed once when the upper limit is 25° C. and the lower limit is 20° C., the upper limit and the lower limit are respectively set to 26° C. and 21° C. On the other hand, for example, if the set-temperature decrease button 31d is pressed once when the upper limit is 25° C. and the lower limit is 20° C., the upper limit and the lower limit are respectively set to 24° C. and 19° C. In other words, both of the upper limit and the lower limit are simultaneously changed.

In step S208, the processor 51 determines whether or not the setting target is the upper limit. Specifically, if the target-setting flag shown in FIG. 4 is given to the "UPPER LIMIT" item, the processor 51 proceeds to step S209. On the other hand, if the target-setting flag shown in FIG. 4 is not given to the "UPPER LIMIT" item, the processor 51 proceeds to step S210.

In step S209, the processor 51 increases or decreases the displayed set temperature (upper limit) by 1° C. on the basis of an input from the set-temperature +/− button, and then proceeds to step S211. For example, if the set-temperature increase button 31c is pressed once when the upper limit is 25° C. and the lower limit is 20° C., the upper limit and the lower limit are respectively set to 26° C. and 20° C. On the other hand, for example, if the set-temperature decrease button 31d is pressed once when the upper limit is 25° C. and the lower limit is 20° C., the upper limit and the lower limit are respectively set to 24° C. and 20° C. In other words, only the upper limit is changed.

In step S210, the processor 51 increases or decreases the displayed set temperature (lower limit) by 1° C. on the basis of an input from the set-temperature +/− button, and then proceeds to step S211. For example, if the set-temperature increase button 31c is pressed once when the upper limit is 25° C. and the lower limit is 20° C., the upper limit and the lower limit are respectively set to 25° C. and 21° C. On the other hand, for example, if the set-temperature decrease button 31d is pressed once when the upper limit is 25° C. and the lower limit is 20° C., the upper limit and the lower limit are respectively set to 25° C. and 19° C. In other words, only the lower limit is changed.

Steps S211 to S215 to be described below correspond to a current-target-setting changing process.

In step S211, the processor 51 determines whether or not a target-setting switching operation has been performed. Specifically, if a target-setting switching operation has been performed by pressing the operation mode button 31b, the processor 51 proceeds to step S212. On the other hand, if a target-setting switching operation has not been performed via the operation mode button 31b, the processor 51 proceeds to step S216. In other words, during normal operation, the operation mode button 31b serving as a button to be used for switching between the automatic mode, the cooling mode, the heating mode, and the setback control is utilized during the setback control, whereby the processor 51 performs the target-setting switching operation. In other words, when the setback control is being performed, the target-setting switching operation is assigned to the operation mode button 31b.

In step S212, the processor 51 determines whether or not the current setting target is the two-limit. Specifically, if the target-setting flag shown in FIG. 4 is given to the "TWO-LIMIT" item, the processor 51 proceeds to step S213. On the other hand, if the target-setting flag shown in FIG. 4 is not given to the "TWO-LIMIT" item, the processor 51 proceeds to step S214.

In step S213, the processor 51 sets the setting target to the upper limit, makes the display section 21 display the set temperature (upper limit) in a blinking manner, and proceeds to step S216. In this case, the flag 1 in the "TWO-LIMIT" item under the setting target shown in FIG. 4 is deleted therefrom, and the flag 1 is set in the "UPPER LIMIT" item instead. Moreover, the upper-limit and lower-limit set-temperature values shown in FIG. 4 are read from the memory 41. Of the two read values, the upper limit is displayed in the area 21a of the display section 21 in a blinking manner, whereas the lower limit is displayed in the area 21b of the display section 21 in a continuously-lit manner.

In step S214, the processor 51 determines whether or not the current setting target is the upper limit. Specifically, if the target-setting flag shown in FIG. 4 is given to the "UPPER LIMIT" item, the processor 51 proceeds to step S215. On the other hand, if the target-setting flag shown in FIG. 4 is not given to the "UPPER LIMIT" item, the processor 51 proceeds to step S217.

If the target-setting flag is given to the "LOWER LIMIT" item, the flag 1 in the "LOWER LIMIT" item may be deleted therefrom, and the flag 1 may be set in the "TWO-LIMIT" item instead.

In step S215, the processor 51 sets the setting target to the lower limit, makes the display section 21 display the set temperature (lower limit) in a blinking manner, and proceeds to step S216. In this case, the flag 1 in the "UPPER LIMIT" item under the setting target shown in FIG. 4 is deleted therefrom, and the flag 1 is set in the "LOWER LIMIT" item instead. Moreover, the upper-limit and lower-limit set-temperature values shown in FIG. 4 are read from the memory 41. Of the two read values, the upper limit is displayed in the area 21a of the display section 21 in a continuously-lit manner, whereas the lower limit is displayed in the area 21b of the display section 21 in a blinking manner.

In step S216, the processor 51 determines whether or not a non-operated time period has exceeded a predetermined time period. Specifically, if the non-operated time period has exceed the predetermined time period, the processor 51 proceeds to step S217. On the other hand, if the non-operated time period has not exceed the predetermined time period, the processor 51 returns to step S205.

The predetermined time period in this case is an arbitrary time period. For example, assuming that the predetermined time period is 10 seconds, the processor 51 proceeds to step S217 if the various operable buttons are not pressed for 10 seconds since the start of blinking display of the set temperatures in step S204.

In step S217, the processor 51 ends the set-temperature changing process (blinking display) and returns to the normal operation.

When step S217 is completed, the processing result of the processor 51 is transmitted to the transmitter unit 61, and is then transmitted to the indoor unit 12 from the transmitter unit 61. Consequently, the air-conditioning apparatus reflects the processing result.

Although the above description relates to an example in which each set temperature is changed by +1° C. or −1° C., the present invention is not limited to this example. For example, each set temperature may be changed by larger values, such as +2° C. or −2° C., or may be changed by smaller values, such as +0.1° C. or −0.1° C. Accordingly, each set temperature may be set more appropriately in accordance with the ambient environment.

Furthermore, although the above description relates to an example in which a settable temperature is displayed in a blinking manner, the present invention is not limited to this example. For example, the settable temperature may be shown by highlighting the characters, displaying the characters in a hollow manner, or changing the font or the size of the characters, so long as the user can basically distinguish the settable temperature from other information.

With the above-described steps S201 to S217, even if the remote controller 11 only has a limited number of buttons and limited display contents, the two set temperatures for setback control can be changed by using the set-temperature increase button 31c and the set-temperature decrease button 31d without making the user perform a complicated operation, such as pressing the buttons multiple times, during an operation mode based on the two set temperatures displayed on the remote controller 11, whereby the setting modes, such as the set-temperature changing process and the current-target-setting changing process, can be completed automatically. Therefore, a user not acquainted with how to operate the remote controller 11 can still intuitively and comfortably change the two set temperatures by simply increasing and decreasing them using the set-temperature increase button 31c and the set-temperature decrease button 31d. Furthermore, since the target-setting changing process can also be performed, operability that allows for changing of the two set temperatures can be achieved for a manager or a user well-acquainted with how to operate the remote controller 11.

In other words, according to Embodiment 1, an interface that is intuitively comprehensible by a user can be provided even if the cost and the product size are reduced.

Accordingly, in Embodiment 1, the remote controller 11 includes the display section 21 that displays information related to the operational status of the air-conditioning apparatus; the operable section 31 for controlling the operational status of the air-conditioning apparatus; the memory 41 that stores information related to set temperatures according to operation modes of the air-conditioning apparatus; the transmitter unit 61 that transmits a command related to the operational status of the air-conditioning apparatus to the air-conditioning apparatus; and the processor 51 that changes the information related to the set temperatures and controls the display section 21 and the transmitter unit 61 on the basis of an operation performed on the operable section 31. The operable section 31 includes the set-temperature increase button 31c that generates an operation signal for increasing each set temperature, and the set-temperature decrease button 31d that generates an operation signal for decreasing each set temperature. In the memory 41, information designating the upper limit, the lower limit, or both the upper limit and the lower limit as a setting target in setback control, which is one of the operation modes, in which air-conditioning is performed within two set temperatures, i.e., the upper limit and the lower limit, is set. The processor 51 makes the display section 21 display the set temperature or temperatures designated by the setting target set in the memory 41, changes the set temperature or temperatures designated by the setting target on the basis of an operation result of one of or both of the set-temperature increase button 31c and the set-temperature decrease button 31d, and transmits the changed result to the transmitter unit 61. Consequently, an interface that is intuitively comprehensible by a user can be provided even if the cost and the product size are reduced.

What is claimed is:

1. An air-conditioning remote controller comprising:
a display section that displays information related to an operational status of an air-conditioning apparatus;
an operable section for controlling the operational status of the air-conditioning apparatus;
a storage unit that stores information related to set temperatures according to operation modes of the air-conditioning apparatus;
a transmitter unit that transmits a command related to the operational status of the air-conditioning apparatus to the air-conditioning apparatus; and
a control unit that changes the information related to the set temperatures and controls the display section and the transmitter unit on the basis of an operation performed on the operable section,
wherein the operable section includes a set-temperature increase button that generates an operation signal for increasing each set temperature, a set-temperature decrease button that generates an operation signal for decreasing each set temperature, and an operation mode button that generates an operation signal to change an operation of the air-conditioning apparatus to one of an automatic mode, a cooling mode, a heating mode and a setback mode, and when the air-conditioning apparatus is in the setback mode, the operation mode button generates a signal to enable a target-setting switching operation,
wherein, in the storage unit, information designating an upper limit, a lower limit, or both the upper limit and the lower limit as a setting target in the setback mode, in which air-conditioning is performed within two set temperatures, which are the upper limit and the lower limit, is set, and
wherein the control unit is configured to make the display section display the set temperature or temperatures designated by the setting target set in the storage unit, change the set temperature or temperatures designated by the setting target on the basis of an operation result of one of or both of the set-temperature increase button and the set-temperature decrease button, and transmit a changed result to the transmitter unit,
wherein when the air-conditioning apparatus is in the setback mode, and the target-setting switching operation is enabled, the control unit is configured to change the upper limit and the lower limit individually, and when the air-conditioning apparatus is in the setback mode, and the target-setting switching operation is not enabled, the control unit is configured to change simultaneously the upper limit and the lower limit designated by the setting target in accordance with an operation of the set-temperature increase button or the set-temperature decrease button.

2. The air-conditioning remote controller of claim 1, wherein the control unit is configured to make the display section display the upper limit and the lower limit when the setback mode starts, makes the display section display the upper limit, the lower limit, or both the upper limit and the lower limit in a blinking manner in accordance with the setting target during the setback mode, and changes the setting target in accordance with an operation for changing the setting target during the setback mode.

3. The air-conditioning remote controller of claim 1, wherein when a signal is not received from the operable section for a predetermined time period during the setback mode, the control unit is configured to end a process for changing the setting target.

4. An air-conditioning system comprising:
the air-conditioning remote controller of claim 1; and
an air-conditioning apparatus controlled by a control command from the air-conditioning remote controller.

* * * * *